UNITED STATES PATENT OFFICE.

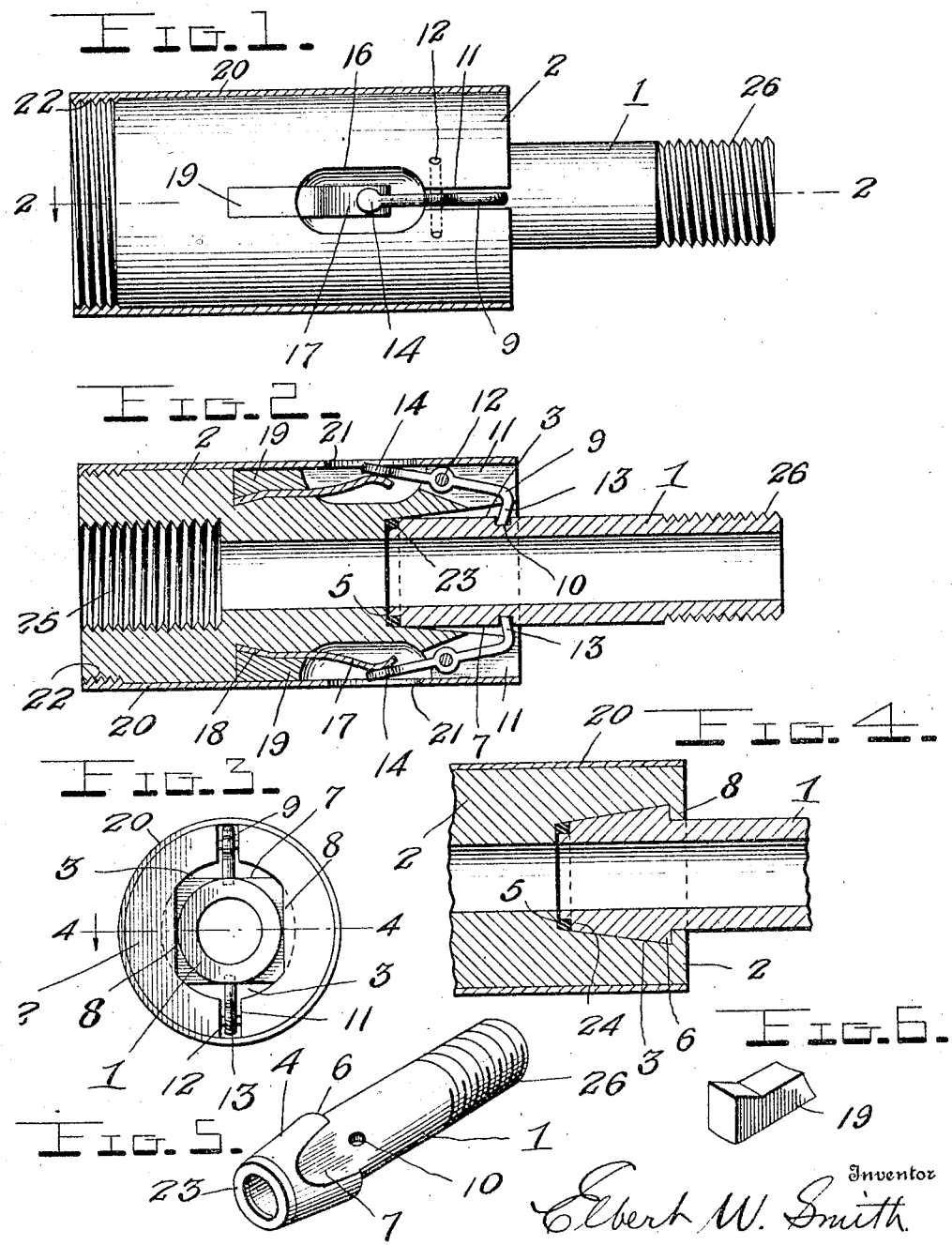

ELBERT W. SMITH, OF HORSE SHOE, NORTH CAROLINA, ASSIGNOR OF ONE-HALF TO WILLIAM C. JORDAN, OF HENDERSONVILLE, NORTH CAROLINA.

HOSE-COUPLING.

No. 925,959.   Specification of Letters Patent.   Patented June 22, 1909.

Application filed December 12, 1908. Serial No. 467,315.

*To all whom it may concern:*

Be it known that I, ELBERT W. SMITH, a citizen of the United States, residing at Horse Shoe, in the county of Henderson and State of North Carolina, have invented certain new and useful Improvements in Hose-Couplers, of which the following is a specification, reference being had to the accompanying drawings.

This invention relates to improvements in hose couplers of that class by means of which two sections of a hose or the like may be quickly connected or disconnected.

The object of the invention is to provide a device of this character which will be simple and practical in construction and effective in accomplishing its intended purpose.

With the above and other objects in view, the invention consists of the novel features of construction and the combination and arrangement of parts hereinafter fully described and claimed, and illustrated in the accompanying drawings, in which—

Figure 1 is a view of the improved hose coupler showing the casing in section; Fig. 2 is a longitudinal section taken on the plane indicated by the line 2—2 in Fig. 1; Fig. 3 is an end view of the socket member; Fig. 4 is an enlarged detail section taken on the plane indicated by the line 4—4 in Fig. 3; Fig. 5 is a detail perspective of the jaw member; and Fig. 6 is a detail perspective of one of the spring retaining blocks.

In the drawings 1 denotes the jaw member and 2 the socket member of the improved hose coupler. The socket member is preferably in the form of a cylindrical body formed at one end with a socket 3 to receive the head or jaw 4 of the member 1, which latter is also cylindrical but of less diameter than the member 2. The socket 3 forms an annular shoulder 5 in the member 2 concentric with its bore or passage and the walls of said socket flare outwardly to correspond to the taper of the head or jaw 4, the inner portion of which latter is of greater diameter than that of the body of the member 2 so as to provide the shoulder 6. Portions of this shoulder 6 at diametrically opposite points on the member 1 are cut away so that the head 4 has flat portions 7 which permit said head to pass oppositely disposed projecting portions or shoulders 8 formed at the mouth or open end of the flared socket 3. Owing to this construction, it will be seen that when the member 1 is held so that its flat faces 7 are opposed to the projections 8 the head 4 may pass into the socket 3 until the shoulders 6 on said head pass the projections 8, whereupon the member 1 may be given a quarter turn to bring the shoulder 6 in rear of the projections 8 and, consequently, lock the two members together or against longitudinal movement with respect to each other. For the purpose of retaining the members in such locked position dogs 9 are provided on the socket member to engage seats or recesses 10 formed in the jaw member, as clearly shown in Fig. 2.

The dogs 9 are in the form of pawl levers disposed in longitudinal slots 11 formed at opposite points in the member 2 and pivoted intermediate their ends on pins 12. Each of the dogs 9 has a bent or hook-shaped end 13 to enter one of the seats 10 and its other end is shaped to provide a finger piece 14 which lies in a recess or cavity 16 formed in the member 2 adjacent to and in communication with the slots or recesses 11. The finger pieces 14 of the dogs or pawls 9 are pressed outwardly by the free ends of leaf springs 17, the angular other ends 18 of which are retained in extended portions of the recesses or cavities 16 by suitably shaped blocks 19, which latter are in turn retained in position by a removable casing in the form of a cylindrical sleeve 20 removably fitted on the member 2. This casing sleeve 20 preferably extends from end to end of the member 1 and covers the outer portions of the slots 11 and recesses 16 so as to protect the dogs 9, said casing sleeve, however, being formed at opposite points with openings 21 disposed opposite the finger pieces 14 of said dogs and of such size as to permit the fingers to be engaged with the dogs to retract their hook-shaped ends 13 from the seats 10. While the casing sleeve 20 may be retained on the member 2 by any suitable means, the same is preferably accomplished by externally screw threading a portion of one end of the member 2, as shown at 22, and engaging said threaded portion with internal screw threads formed in the corresponding end of the casing sleeve. For the purpose of rendering the joint or connection between the two members fluid tight, a gasket 23 of rubber or the like is arranged in an annular recess or seat 24 formed in the small end of the jaw or head 4 of the member 1, whereby when the latter is inserted in the socket 3 of the member 2 said gasket or washer will engage the shoulder 5, as seen in Fig. 2.

The outer ends of the two members 1, 2 may be provided with any suitable means whereby they may be connected to the sections of hose, pipes, or the like or to coupling devices on hose sections or on fire plugs, hydrants, etc. As illustrated, however, the member 2 is formed with a screw threaded socket 25 to receive an ordinary screw threaded projection on a coupling and the outer end of the member 1 is provided with external screw threads 26 to enable it to be screwed into an ordinary coupling. By constructing the members in this manner, it will be seen that the device may be used between the members of an ordinary screw coupling and should it be impossible, for any reason, to couple the two members of my improved quick coupling device, said members may be removed and the regular screw coupling employed to unite the hose sections.

Having thus described the invention what is claimed is:

1. A hose coupler comprising a cylindrical jaw member formed at its outer end with an outwardly tapered or cone-shaped head, the latter forming at its inner end a shoulder and having portions at opposite points cut away, said member being formed opposite the flattened portions of the head with recesses, a socket member having in its outer end a cone-shaped socket to receive the head of the jaw member, the outer portion of said socket being formed at opposite points with inwardly extending projections to form shoulders adapted to be engaged by the shoulders formed by the head of the jaw member, whereby the two members will be retained in engagement with each other, a packing ring set in the outer end of the head of the jaw member and adapted to engage the bottom of the socket in the socket member, and dogs carried by the socket member and adapted to engage the recesses in the jaw member to prevent the latter from rotating with respect to the socket member when said shoulders on the members are engaged.

2. A hose coupler comprising a jaw member, a socket member to receive the jaw member and formed at opposite points with recesses, dogs pivoted in said recesses for holding the members together, leaf springs in said recesses in the socket member, retaining blocks engaged with said leaf springs and arranged in said recesses of the socket member and a casing sleeve removably arranged on the socket member and adapted to retain said blocks and springs in said recesses, said casing sleeve being formed with openings to expose portions of the dogs, whereby the latter may be operated.

3. A hose coupler comprising a jaw member, a socket member to receive the jaw member and formed at opposite points with recesses, dogs pivoted in said recesses for holding the members together, leaf springs in said recesses in the socket member and having angular ends and free ends to engage and actuate said dogs, retaining blocks engaged with said angular ends of the springs, and a removable casing sleeve having a threaded engagement with the socket member and adapted to retain said blocks in the latter, said casing sleeve being formed with openings to expose portions of the dogs, whereby they may be operated.

In testimony whereof I hereunto affix my signature in the presence of two witnesses.

ELBERT W. × SMITH.
his mark.

Witnesses:
J. D. DAVIS,
S. M. KING.